INVENTOR
CHARLES C. PERRY

United States Patent Office 3,355,708
Patented Nov. 28, 1967

3,355,708
SAFETY LIGHT DEVICE FOR VEHICLE INTERIORS TO INDICATE VISUALLY THE CONDITION OF THE EXTERIOR LIGHTS
Charles C. Perry, 9725 Waters Road,
Ann Arbor, Mich. 48103
Filed Mar. 15, 1965, Ser. No. 439,886
4 Claims. (Cl. 340—80)

ABSTRACT OF THE DISCLOSURE

Apparatus for an automobile for indicating to the operator which of the external lamps of the vehicle is illuminated. A panel is provided which has the outline of the vehicle as viewed from above, and indicator lamps are positioned thereon corresponding in location to all of the external lamps. The indicator lamps are in electrical circuits with their corresponding exterior lamps so that the operator can determine merely by glancing at the panel the condition of all of the external lamps.

---

Figure 1:
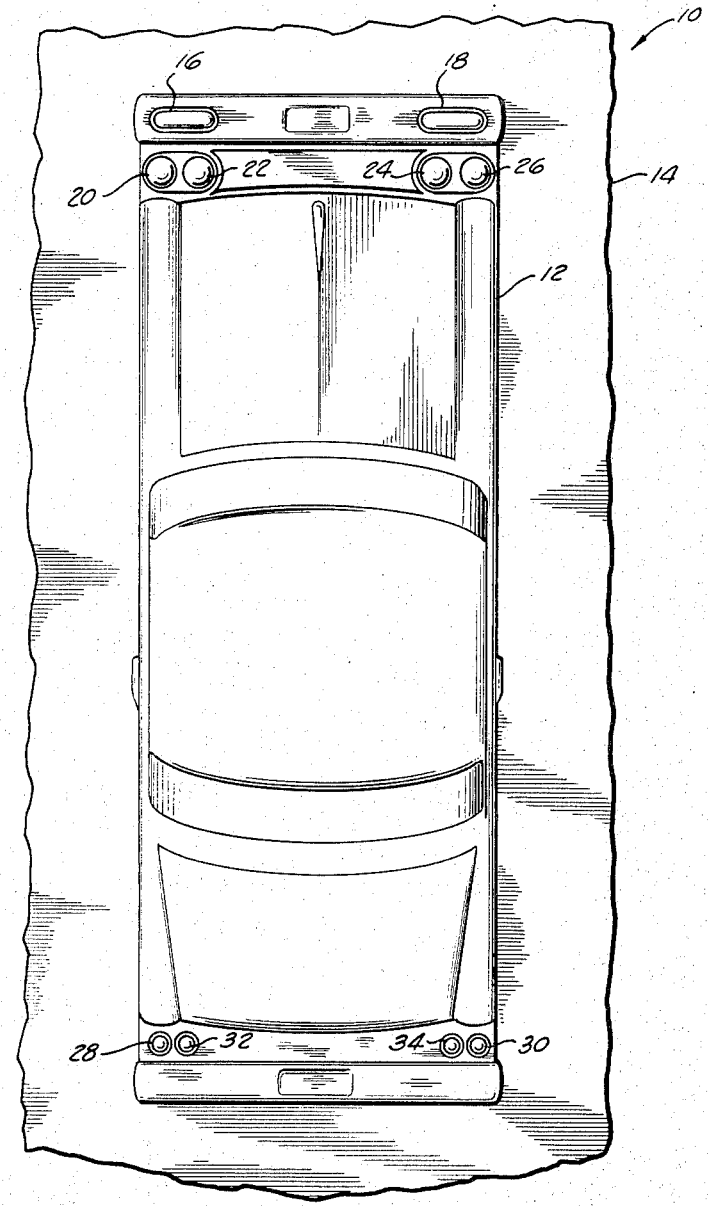

The present invention relates to improvements in indicator devices for indicating conditions of electric lighting circuits of a motor vehicle, and more particularly, to indicate which of the external lamps of the vehicle are illuminated at any particular time.

Various devices have previously been proposed for determining defects in lighting systems in motor vehicles and for indicating such defects to the operator of the vehicle, but such devices have been used to a limited degree and generally have not been effective to accomplish the desired end. One of the defects of prior devices is that they fail to give to a driver an indication, merely at a glance, of the condition of each of the exterior lights of the driven vehicle. This is a significant defect because modern driving conditions require the driver to give full attention to surrounding traffic and other problems of travel, and preclude the use of devices which require time consuming studying by the driver to enable him to determine if the exterior lights of the vehicle are functioning properly.

It is a principal object of the present invention to provide an improved indicator for automatically and continuously indicating visually to the driver of a vehicle, and which can be observed and understood merely at a glance while he is driving, the condition of his running lights which are intended to be in use.

More particularly, it is an object of the present invention to provide an improved indicator of the foregoing character which is constructed and arranged so that it simulates a motor vehicle and has indicator lamps which are appropriately connected with corresponding running lamps of the vehicle for indicating the operation or non-operation of such corresponding running lamps so as to facilitate substantially instant recognition by the driver of lamps that fail to function properly and continuous assurance that intended lights are functioning normally.

It is still another object of the present invention to provide an improved indicator of the foregoing character which will indicate the condition of operation of turn signal lamps and bright and dim indicators for headlamps so as to avoid the need for separate indicator devices of the type now conventionally in use.

It is still another object of the present invention to provide an indicator of the foregoing character which will be operable independently of an ignition switch so that if lamps of the vehicle which are independent of the ignition switch are energized when the driver prepares to leave the vehicle, the indicator will indicate that such lamps are on.

Other objects of this invention will appear in the following description and appended claims, reference being had to the accompanying drawings forming a part of this specification wherein like reference characters designate corresponding parts in the several views.

Figure 2:
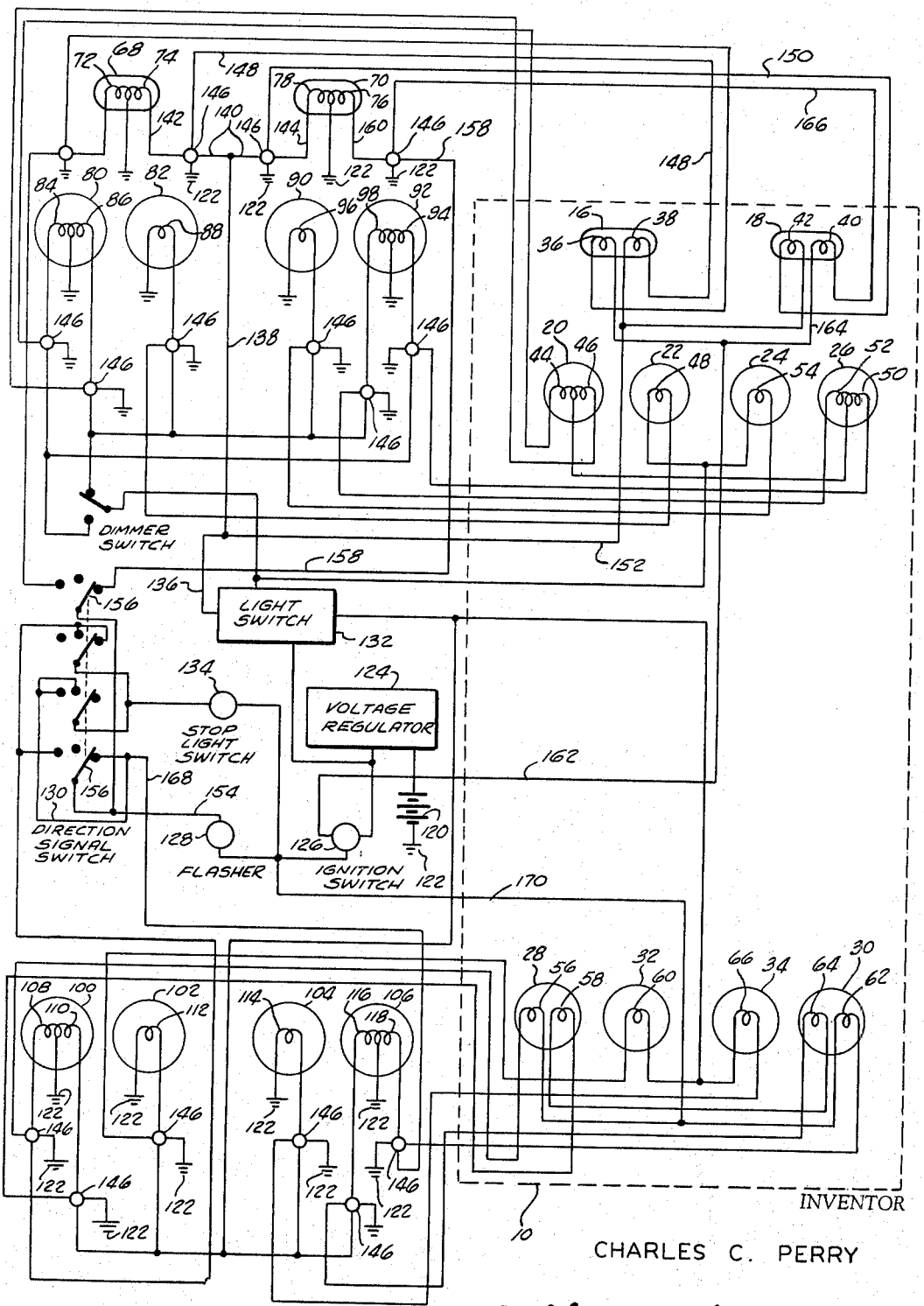

In the drawing:

FIGURE 1 is a fragmentary plan view of a panel showing an indicator embodying the present invention; and FIGURE 2 is a schematic wiring diagram showing the electric circuits between the indicator shown in FIG. 1 and the conventional electric lighting system of a motor vehicle.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings the invention will now be described in greater detail. The indicator device 10 can be made as a part of the instrument panel of a motor vehicle or as a separate panel which can be mounted in the interior of the motor vehicle in a location where it can be readily observed by the driver. The indicator device 10 has indicia 12 formed in the panel 14 to simulate a motor vehicle, and preferably substantially the vehicle on which the device is mounted. Forming a part of the simulated motor vehicle are a plurality of indicator lamps which correspond in numbers and locations to the running lamps of the motor vehicle in which the indicator device 10 is mounted. Thus, the indicator lamp 16 represents the left front turn signal lamp and the left front parking lamp, and similarly, indicator lamp 18 represents the right front turn signal lamp and the right front parking lamp. Also located at the front of the simulated motor vehicle are the left front dual indicator headlamps 20 and 22, as well as the right front dual indicator headlamps 24 and 26. In the conventional manner, lamps 20 and 26 are the dim or lower headlamps, and these headlamps also have additional filaments, which will be described, which are adapted to be energized together with the filaments in lamps 22 and 24 to provide upper or bright headlamps.

At the rear of the simulated vehicle will be found conventional rear indicator lamps of the motor vehicle. Thus, the left and right indicator lamps 28 and 30 each have two sets of filaments, one of which functions as part of the stop light and turn signal circuits, and the other of which functions as part of the tail lamp system of the vehicle. Indicator lamps 32 and 34 are representative of conventional tail lamps of the vehicle.

It will be observed that the simulated vehicle is a developed configuration of the top, front, and rear of the vehicle so as to show lamps 16 and 18, which normally may be located under the dual headlamps 20, 22 and 24, 26. A three-dimensional or quasi-three dimensional replica of the vehicle heightens the effect of the developed vehicle.

As previously indicated, in normal usage, the panel 14 on which the simulated vehicle 12 is formed may be integral with the conventional instrument panel of the vehicle or may be a separate panel located in a suitable location such as adjacent the steering post, or the like, where it is readily visible to the driver.

The indicator lamps shown in the simulated vehicle are each electrically connected to corresponding ones of the running lights or lamps of the vehicle so that each indicator lamp will be energized when the corresponding running lamp is energized, and similarly, each indicator lamp will be deenergized when its corresponding running lamp is deenergized or burned out.

Referring to FIGURE 2, the arrangement of electrical circuits that may be employed with the present invention will be described. However, it should be understood that the present invention is not limited to the specific circuits illustrated, because other conventional lighting circuits or electrical components may be used with the indicator device comprising the present invention.

The indicator device 10 is illustrated schematically in FIGURE 2 by a rectangular area shown in dotted lines. As there shown, the indicator lamp 16 contains the left turn signal filament 36 and the left front parking filament 38, and indicator lamp 18 contains the right front turn signal filament 40 and right front parking filament 42.

The left front indicator lamp 20 contains filaments 44 and 46 which are respectively the lower or dim headlamp filament and the upper or bright headlamp filament; and indicator lamp 22 contains the other upper or bright headlamp filament 48. In a similar fashion, indicator lamp 26 contains dim or lower headlamp filament 50 and bright or upper headlamp filament 52, and lamp 24 contains bright or upper headlamp filament 54.

The rear indicator lights are also shown schematically in the indicator device 10 of FIGURE 2, and as there illustrated, the lamp 28 has filament 56 for the left stop and turn signal and filament 58 for the left tail light; and lamp 32 has filament 60 for the second left tail light. The right rear lamps 30 and 34 are similarly constructed, lamp 30 having a right stop and turn signal filament 62 and right tail light filament 64 with lamp 34 having a right tail light filament 66.

As previously described, indicator lamps forming a part of the indicator device 10 are electrically associated with corresponding lamps of the motor vehicle in which the indicator device 10 is mounted. Attention is again directed to FIGURE 2 which also illustrates schematically the conventional lamps of the motor vehicle. Thus, the running lamps 68 and 70 provide the left and right front turn signal lamp filaments as well as the front parking lamp filaments. For this purpose the lamp 68 has filament 72 in the left turn signal circuit and filament 74 in the front parking lamp circuit, and lamp 70 has filament 76 in the right turn signal circuit and filament 78 in the front parking lamp circuit.

The left front dual headlamps 80 and 82 have respectively the dim or lower headlamp filament 84 and the upper or bright headlamp filaments 86 and 88. Similarly, the right front dual headlamps 90 and 92 have the dim or lower headlamp filament 94 and the bright or upper headlamp filaments 96 and 98.

The rear running lamps of the motor vehicle are shown schematically at 100, 102, 104, and 106. The left rear lamp 100 contains the left stop and turn filament 108 and the left tail lamp filament 110 and the other left rear lamp 102 also contains a left tail lamp filament 112. Similarly, the right rear lamps 104 and 106 contain right rear tail lamp filaments 114 and 116, and lamp 106 contains the right stop and turn signal filament 118.

FIGURE 2 also schematically shows the various conventional electrical elements that are found in the light system of motor vehicles. Thus, a battery 120 is shown connected to a common ground 122 and to a voltage regulator 124. The latter is connected in series with the ignition switch 126, a flasher 128 and a turn signal switch 130. Also directly connected to the voltage regulator and parallel with the ignition switch circuit is the light switch 132 which is directly connected to certain of the running lamps, as will presently be described. Also directly connected with the voltage regulator via the ignition switch, but parallel with the flasher 128 is a conventional stop light switch 134 which is normally actuated by operation of the foot brake pedal of the vehicle.

The light switch 132 is electrically connected to the front parking lamp filaments 74 and 78 via the conductors 136, 138, 140 and 142, and 136, 138, 140 and 144, respectively. Located in each of the circuits to these parking lamps are the current responsive switches, relays, or the like 146 which will not be described in detail because they may be any of a variety of well known electro-magnetic, electronic, thermal or solid state devices which are normally open and are responsive to passage of current to close a second circuit. It will be observed that each of these switches 146 is connected in series with the corresponding filament of the corresponding indicator lamp in the indicator device 10 and such corresponding filament is located in the second circuit which is adapted to be closed by the switch 146. Thus, the switch 146 associated with the circuit containing filament 74 is connected in series by conductor 148 with the filament 38 in the indicator parking lamp 16. Similarly, the switch 146 in the circuit leading to filament 78 is electrically connected in series by the conductor 150 with the filament 42 of the corresponding parking lamp 18. It will also be observed that the filaments 38 and 42 of the indicator parking lamps 16 and 18 are connected by the conductor 152 to electric switch 132 via the conductor 136. Thus, when current is passing through either of filaments 74 or 78 of parking lamps 68 and 70, the associated switch 146 will be energized in response to the passage of current to close a circuit including light switch 132, conductor 136, conductor 152, the corresponding filament 38 or 42, conductor 148 or 150, associated switch 146 to common ground 122. Should current stop passing through either or both filaments 74 and 78 for any reason whatsoever, one or both of the associated switches 146 will be deenergized and will therefore open the circuit containing the corresponding indicator lamp filament 38 or 42. Thus, the driver of the vehicle can be informed immediately, merely by a glance at the indicator device 10 that the running lamp corresponding to the indicator light is either energized or deenergized as appears on the indicator device 10.

Since the right and left turn signal circuits are substantially identically constructed, only the right turn signal circuits will be described. The directional signal switch 130 is shown closed in a right turn indicating position. When in this position, a circuit is closed including battery 120, voltage regulator 124, ignition switch 126, flasher 128, conductor 154, switch element 156, conductor 158, current responsive switch 146, conductor 160, filament 76, to common ground 122. Passage of current through this circuit will energize current responsive switch 146 which will then have the effect of closing a corresponding circuit including battery 120, voltage regulator 124, ignition switch 126, conductor 162, conductor 164, filament 40, conductor 166, current responsive switch 146, to ground 122. Thus, each time the flasher 128 interrupts passage of current through the front right turn signal lamp filament 76, current will similarly be interrupted in its passage through filament 40 of the indicator lamp 18, and therefore, a flashing light will occur at lamp 18 on the indicator device 10. Should the filament 76 of front right turn indicating lamp 70 fail to pass current for any reason, then indicator lamp filament 40 also will cease to have current passed through it, and thus, the operator of the vehicle will immediately be informed of the failure of the operation of his right front turn indicating signal lamp.

Without describing the left turn indicating signal system, it is believed that it will be readily understood that failure of the filament 36 in the indicator lamp 16 to flash at the appropriate times will indicate to the driver of the vehicle that the front left turn signal lamp is not functioning properly.

The operation of the rear right turn signal will next be described. When the directional signal switch 130 is closed to indicate a right turn, a circuit will be closed including the battery 120, the voltage regulator 124, the ignition switch 126, the flasher 128, conductor 154, switch element 156, conductor 168, current responsive switch 146, rear right turn signal filament 118 to common ground 122. Passage of current through the current responsive switch 146 associated with filament 118 will cause current to flow through the circuit comprising battery 120, voltage regulator 124, ignition switch 126, conductor 170, right turn indicator filament 62, current responsive switch 146 to ground 122. Thus, it can be seen, that the rear right turn indicator filament 62 will be energized at the same time as the filament 118 of the rear turn signal lamp 106, and conversely, when filament 118 fails to pass current for any reason, the corresponding rear right turn indicating filament 62 will be deenergized.

It will also be observed that the stop light switch 134 is electrically connected with the directional signal switch 130 so that when current can pass through the rear right turn signal filament 118, the lamp 106 will not be energized to indicate that the vehicle is being stopped, but this function will be performed in the normal means by the left stop signal lamp 100. This circuitry is conventional, and it is not believed necessary to describe it in detail, its operation being readily apparent from an examination of the drawings.

The various other lamps of the motor vehicle are similarly connected to their corresponding indicator lamps located in the indicator device 10. It will be observed that each of these connecting circuits contains a current responsive device 146, namely, a current detector which detects flow of current in the connecting circuit and which will function to open the circuit between the filament of any indicator lamp and battery 120 if current is not passing through the filament of the corresponding running lamp of the vehicle. It is not believed necessary to describe each of these circuits separately, because each of them will function in the same manner as the circuits previously described.

From the foregoing description, it is believed clear that an improved indicator device has been disclosed which will enable the operator at a glance to determine the condition of any of the running lamps of the vehicle which are intended to be in operation. It will also be observed that the indicator device will eliminate the need of a separate set of turn signal indicator lights and bright and dim headlight indicators of the type now conventionally in use in motor vehicles. It is to be understood that while only a single conventional vehicle lighting system has been illustrated and described in connection with one embodiment of the invention, the indicator of this invention is readily adaptable to any vehicle lighting system so as to achieve the unique advantages of the invention. The pattern of the indicator lamps on the device 10 does not necessarily correspond exactly to the pattern of the exterior lamps on the vehicle on which the device 10 is installed. The driving public is at all times aware of the currently generally accepted pattern of exterior lights on automobiles, and it is therefore intended that the pattern on the device 10 will correspond substantially to that generally accepted pattern so that at a glance at the device 10 will provide a maximum of immediate information.

In describing the illustrated embodiment, reference has been made to indicator lamps. It is to be understood that other luminous means or light patterns or rays may be used which will provide the desired disclosure at a glance of the driver. Thus, the device 10 and the indicator lamps may be so arranged that only diffused lights or rays will be visible, or lamps may be positioned behind windows colored to conform to the color of the corresponding running lamp, and the like.

Having thus described my invention, I claim:

1. An indicator device for indicating visually the condition of running lamps of a vehicle comprising a panel having indicia simulating the outline of said vehicle as viewed from above, a plurality of indicator lamps positioned in said indicia corresponding in numbers and locations to the running lamps of said vehicle, and electric circuits between said running lamps and said indicator lamps for passing electric current continuously through filaments of indicator lamps when electric current is passing through filaments of corresponding running lamps.

2. In combination in a motor vehicle, a plurality of running lamps on said vehicle, an instrument panel, indicia means on said instrument panel simulating the appearance of said vehicle as viewed from above and including a plurality of illuminating indicator means corresponding in number and locations to said running lamps, and electric circuits between said running lamps and corresponding indicator means for energizing each indicator means only when electric current is passing through filaments of the corresponding running lamp.

3. In combination with a vehicle instrument panel, a plurality of indicator lamps corresponding in numbers to the external lamps on said vehicle and arranged in a pattern on said instrument panel corresponding to the pattern of external lamps on the vehicle as viewed from above, and means for maintaining each of said indicator lamps in a lighted or unlighted condition corresponding to the respective lighted or unlighted condition of the corresponding lamp on the exterior of the vehicle.

4. In combination with a vehicle having an interior and a plurality of exterior lamps, a plurality of indicator lamps corresponding substantially in number to the number of said exterior lamps and arranged in a pattern in said vehicle interior corresponding substantially to the pattern of said exterior lamps on the vehicle as viewed from above, electrical conductors connected to each of said exterior lamps for supplying electric current thereto, a current detector operatively associated with each of said electrical conductors, and circuit means responsive to actuation of each of said current detectors for providing for a flow of current to the indicator lamp corresponding in said interior pattern to the lamp in said exterior pattern being supplied with current, whereby each of said indicator lamps is at all times maintained in a lighted or unlighted condition corresponding to the respective lighted or unlighted condition of the corresponding lamp on the exterior of the vehicle.

References Cited

UNITED STATES PATENTS 2,717,988   9/1955   Myers _____ 340—252 X

THOMAS B. HABECKER, *Acting Primary Examiner.*

NEIL C. READ, *Examiner.*

A. WARING, *Assistant Examiner.*